(12) United States Patent
Lopatinsky et al.

(10) Patent No.: US 7,586,232 B2
(45) Date of Patent: Sep. 8, 2009

(54) FLAT RADIALLY INTERACTING ELECTRIC DRIVE AND A METHOD OF THE MANUFACTURING THE SAME

(75) Inventors: Edward Lopatinsky, San Diego, CA (US); Lev Fedoseyev, El Cajon, CA (US); Daniel Schaefer, Konarravile, UT (US)

(73) Assignee: Industrial Design Laboratories, Inc, San Diego, CA (US)

( * ) Notice: Subject to any disclaimer, the term of this patent is extended or adjusted under 35 U.S.C. 154(b) by 563 days.

(21) Appl. No.: 11/407,173

(22) Filed: Apr. 19, 2006

(65) Prior Publication Data
US 2006/0238064 A1 Oct. 26, 2006

Related U.S. Application Data

(60) Provisional application No. 60/674,755, filed on Apr. 26, 2005.

(51) Int. Cl.
*H02K 3/04* (2006.01)
*H02K 1/00* (2006.01)
(52) U.S. Cl. ........................ 310/267; 310/254; 310/268

(58) Field of Classification Search ............ 310/DIG. 6, 310/254, 258, 259, 266–268; 336/120, 223
See application file for complete search history.

(56) References Cited

U.S. PATENT DOCUMENTS

| 4,668,884 | A | * | 5/1987 | Amao et al. | 310/68 R |
|---|---|---|---|---|---|
| 5,637,945 | A | * | 6/1997 | Yamamuro et al. | 310/268 |
| 6,144,126 | A | * | 11/2000 | Kodama | 310/68 B |
| 6,664,673 | B2 | * | 12/2003 | Lopatinsky et al. | 310/63 |
| 6,698,505 | B2 | * | 3/2004 | Lopatinsky et al. | 165/122 |
| 7,112,910 | B2 | * | 9/2006 | Lopatinsky et al. | 310/268 |
| 7,199,691 | B2 | * | 4/2007 | Miya | 336/120 |

\* cited by examiner

*Primary Examiner*—Tran N Nguyen

(57) ABSTRACT

A flat radially interacting electric drive comprises a flat stator, an axle and a magnetized flat rotor. The flat stator comprises a stator core made of silicon steel and placed within two layers of circuit boards. The circuit boards layers comprise circumferentially arrayed traces that are corresponding unidirectional segments of spatial continuous zigzag lines serving like coils with magnetic axes being directed radially. The coils electrically connected in a series way thus form a stator winding with alternated polarity coils. The flat rotor comprises circumferentially arrayed alternatively magnetized flat magnets with radially directed magnetic axes.

17 Claims, 18 Drawing Sheets

FLAT RADIALLY INTERACTING ELECTRIC DRIVE AND A METHOD OF THE MANUFACTURING THE SAME

CROSS REFERENCE TO RELATED APPLICATIONS

The present application claims the benefit of priority of U.S. Provisional Patent Application No. 60/674,755, filed Apr. 26, 2005 for Edward Lopatinsky et al. the entire content of which is incorporated herein by reference.

FIELD OF THE INVENTION

The present invention relates generally to brushless DC electric drives. More particularly, the present invention relates to flat type electric drives. The present invention is particularly, but not exclusively, useful for blowers of cooling systems for regulating the temperature of electronic components.

BACKGROUND OF THE INVENTION

Well-known are electric drives of end-face rotor-stator interaction type, where the rotor is a disk, on the end surfaces whereof permanent magnets of alternating polarity are located over the circumference. The stator of such machines is made in the shape of a disk (ring), installed coaxially with the rotor thus the stator and the rotor located in different planes, electromagnetic stator coils being located at the end faces of the stator. For instance, the direct current brushless electric motor (electric drive) described in U.S. Pat. No. 5,440,185 "Composite Magnet Brushless DC Motor" belongs to this type of electric machines. The known device includes at least one rotor installed on the axle and made as a multi-pole magnetic disk consisting of sections spaced along the circumference, where the polarity of the sections alternates. The device also includes at least one disk-shaped stator element, determining the rotor position, the device for mounting the rotor (rotors) and stator element (elements) on the common axle, the sensor for positioning the multi-pole magnetic disk versus the stator element and a device to identify the magnetic field profile in the stator elements. Two windings are wound over the stator elements, electric current being fed to one of those thus determining the polarity of the stator poles. The known device is not easy in manufacturing, the biggest difficulty being manufacturing of disk-shaped rotors with magnetic poles of alternating polarity.

The improved design described in U.S. Pat. No. 6,515,390 "Electric Drive" and comprises a rotor made in the form of two disks, the teeth of which on the outer or inner circumference make up rotor poles and an axially magnetized polygon or cylindrical magnet placed between said disks. The stator made in the form of coils that are distributed over the circumference and that are installed predominantly in the space between the rotor poles provides for the possibility of the end face interaction with the rotor poles. The rotor could be made as a multi-sectional unit. In this case the disks have the plate-like shape, and the poles of one disk are coincided with the poles of another disk in one plane, while the magnets of adjacent section are oriented towards one another with like poles. The disks could be made integral with a magnet in such a manner that they serve as magnet's poles. The rotor poles are located in the planes perpendicular to device axis and stator poles are located in such a way that a possibility of the end face interaction with rotor poles is provided for, it becomes possible to reduce the radial size of the device. A plate-like shape of said disks makes it possible to optimize the size of the device depending on the magnet and stator used required power and the size of a device, in which this electric drive is supposed to be mounted.

The known flat brushless DC electric drives are often using with blowers for electronic cooling systems, for instance U.S. Pat. No. 6,664,673 "Cooler for electronic devices". The regulation of the temperature due to heat generated inside the housing of an electronic device is an important consideration during the design of an electronic device. Cooling is important because if left unchecked, heat can cause electronic devices to malfunction during use or lead to premature device failure. As improvements in processor size and speed occur, the amount of heat generated by the larger and faster processors also increases. Additionally, improved processors require larger power supplies and auxiliary components that generate increased amounts of heat and require improved systems for heat removal.

Another factor that aggravates the need for improved heat removal cooling systems is the trend towards making computing devices smaller and especially thinner. The trend toward smaller and thinner electronic devices having larger, faster processors renders the traditional heat removal cooling systems inadequate for several reasons.

In order to enhance the cooling capacity of a cooling device, an electrically powered blower is often mounted within or on top of a heatsink of the cooling device. In operation, the blower forces air to pass over fins of the heatsink, thus, cooling the heatsink by enhancing the heat transfer from the fins into the ambient air.

According to mention above modern requirements for cooling devices especial importance is devoted to electric drives used with blowers. Thus, modern electric drive must have high efficiency, enough torque, low noise generation and compact size.

Due to modern requirements for cooling devices, especially in respect to a combination of the thermal efficiency and an available space, flat electric drives are often used with radial type impellers of blowers for cooling of electronic components. There are such devices describe in U.S. Pat. No. 6,664,673 "Cooler for Electronic Devices" and No. 6,700,781 "Heat-Dissipating Module for Removing Heat Generated from Heat-Generating Device". Also, an invention described in U.S. Pat. No. 6,698,505 "Cooler for electronic device" discloses a crossflow blower with a radial impeller. All mentioned above inventions comprise a flat stator plate made as circuit board and a magnetized rotor fixed to a radial impeller of the blower. The flat stator and the magnetized rotor are located in two different parallel planes and separated by an air gap.

However, such arrangement cause a vibration of the flat stator and magnetized rotor due to a rise of oscillation forces in a direction perpendicular to the planes of the flat stator and the magnetized rotor. These forces determine by an interaction between magnetic poles of the stator and rotor. In one's turn the vibration generates an increasing sound level thus contradicts with modern requirements for cooling devices.

On the other hand mentioned vibration causes energy losses thus decrease the motor efficiency of the electric drive and, correspondingly, blower efficiency.

There is an electric drive described in U.S. Provisional Patent Application No. 60/586,128 "An Integrated Blower for Cooling device" comprises a flat stator and a magnetized rotor that are located in one plane.

Although mentioned arrangement of the flat stator and the magnetized rotor solve above mentioned problems related to efficiency and a noise generation, there is another problem rising. According to this design the magnetized rotor comprising circumferential magnetic means with alternative polarities placed and magnetized along the plane of the flat stator. It is very difficult to manufacture the magnetized rotor as a whole due to problems arising during magnetization. And more, strong magnetic forces arising after magnetization lead to significant stresses that made the magnetized rotor more fragile. Therefore, such designs cannot be thin enough and manufacturing of magnetized rotor become complicate and expensive.

Above mentioned problem was solved according to U.S. Provisional Patent Application No. 60/627,405 "Flat Electric Drive" comprises a flat stator and a magnetized rotor made like a flat toothed ring. The flat stator located at a plane of the flat toothed ring and comprises at least one set of even number of circumferential arrayed alternated polarity coils with magnetic axes coincide with the plane of the ring. The flat toothed ring comprises teeth located at least one of an outer and an inner diameters of the ring, thus a number of teeth located at the same diameter is equal a half of number of the coils. The toothed ring is magnetized along radial directions thus the teeth located at the same diameter are like poles.

Both last mentioned electric drives comprise spatial coils wound around the core, thus a production of such stators is complicate and expensive.

It would be desirable to provide a compact flat electric drive and a method of manufacturing the same that would overcome these aggregate problems associated with simplicity, cost, efficiency, torque and sound level.

SUMMARY OF THE INVENTION

Accordingly, it is an object of the present invention to provide a flat radially interacting electric drive and a method of manufacturing the same, which are capable of significantly improving of size and efficiency of the electric drive and simplifies the manufacturing process.

In order to achieve this goal, a flat radially interacting electric drive comprises a flat stator, an axle and a magnetized flat rotor. The stator made like a composite structure comprising a layer made of ferromagnetic material serving like a stator core, placed within two layers of circuit boards. The first layer of the circuit board comprises circumferentially arrayed groups of traces that are unidirectional segments of zigzag lines with a path directed radially, while the second layer of the circuit board comprises circumferentially arrayed groups of traces which in transparent view are opposite unidirectional segments of the same zigzag lines. Each of the traces located at the first layer have nodes coincided with corresponding nodes of each of the traces located at the second layer in transparent view.

Further, each of the traces located at the first layer are electrically connected at the nodes with each corresponding nodes of the traces located at the second layer, thus both layers form circumferentially arrayed spatial continuous zigzag lines serving like coils with magnetic axes that are directed radially. The coils are electrically connected in a way thus form a stator winding with alternated polarity coils. The flat rotor comprises circumferentially arrayed alternatively magnetized flat magnets with radially directed magnetic axes.

The stator core made as a flat ring with radial teeth that are located inside of a contour defining by an array of the nodes. The layer made of ferromagnetic material could be made from silicon steel. A space within two layers of circuit boards free from the stator core is filled with electrically nonconductive material, for example, epoxy.

According to the first embodiment of the present invention, the magnetized flat rotor is placed substantially at the same plane of the flat stator and surrounded by the flat stator through a radial gap. A number of the flat magnets is equal a number of the coils and the radial teeth are located from the inner side of the flat ring.

According to the second embodiment of the present invention, the flat stator is placed substantially at the same plane of the magnetized flat rotor and surrounded by the flat magnets through a radial gap. A number of the flat magnets is equal a number of the coils and the radial teeth are located from the outer side of the flat ring.

According to the third embodiment of the present invention, the flat rotor further comprises circumferentially arrayed alternatively magnetized additional flat magnets with radially directed magnetic axes and the flat stator is placed substantially at the same plane of the magnetized flat rotor within the flat magnets and the additional flat magnets through radial gaps. Numbers of the flat magnets and the additional flat magnets are equal a number of the coils and radial teeth are located from the inner and outer sides of the flat ring.

According to the last embodiment of the present invention, which is a modification of the second embodiment, the flat radially interacting electric drive further comprises an additional flat stator similar to the flat stator and placed substantially at the same plane of the magnetized flat rotor, thus the magnetized flat rotor is surrounded by the additional flat stator through a radial gap. A number of the flat magnets is equal a number of the coils and radial teeth of the additional flat stator are located from the inner side of a flat ring of the additional flat stator.

There is a design option of the last embodiment when the first layer of the flat stator and a first layer of the additional flat stator are made like a mutual first layer and the flat rotor is spaced apart from the mutual first layer through an axial gap.

According to the present invention, a method for manufacturing a flat radially interacting electric drive comprises the following steps.

At the first three steps the first and the second layers of circuit board and a layer made of ferromagnetic material serving like a stator core are provided. At the fourth step the stator core aligned and pressed bond within the first and the second layers of circuit boards. After that, holes with centers located at nodes of future traces are drilled and copper plated.

At the sixth step circumferentially arrayed groups of traces that are unidirectional segments of zigzag lines are etched on the outer sides of the first and the second layers of circuit boards. An axle and a magnetized flat rotor with circumferentially arrayed alternatively magnetized flat magnets with radially directed magnetic axes both provided before the last step of the final assembling of the flat radially interacting electric drive.

DETAILED DESCRIPTION OF PREFERRED EMBODIMENTS

Preferred embodiments of the present invention will be described in detail below with reference to the accompanying drawings.

Figure 1:
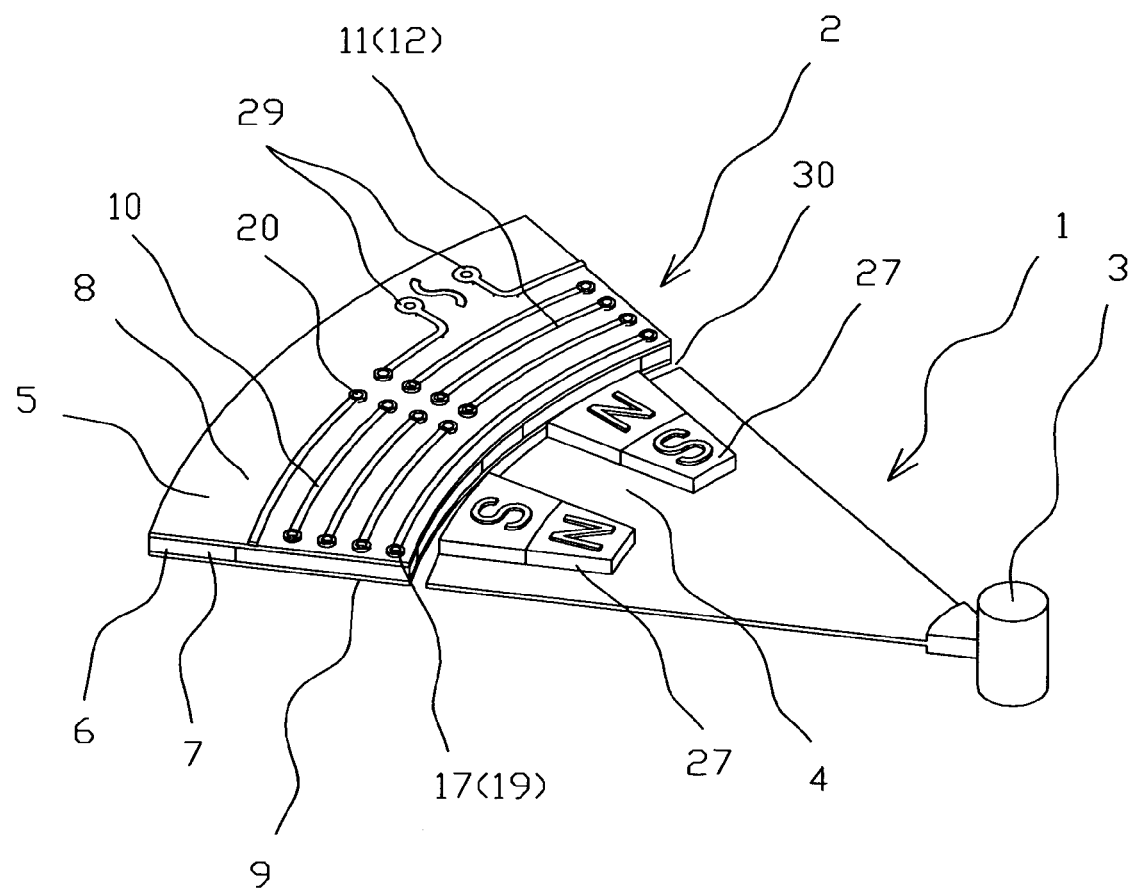
FIG. 1 is a perspective view showing the segment of the flat radially interacting electric drive according to the first embodiment.
Figure 2:
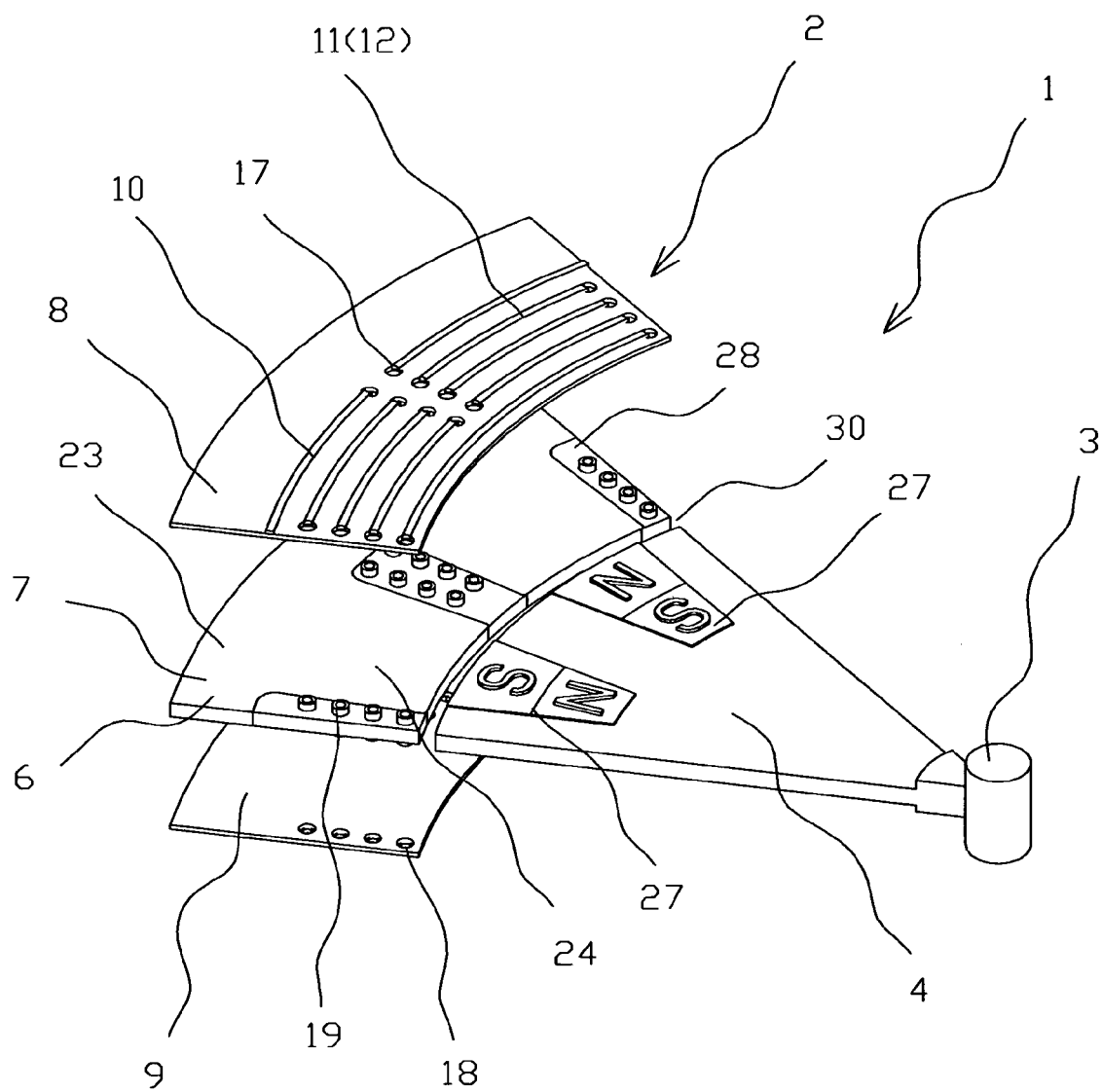
FIG. 2 is a perspective disassembled view showing the segment of the flat radially interacting electric drive according to the first embodiment.
Figure 3:
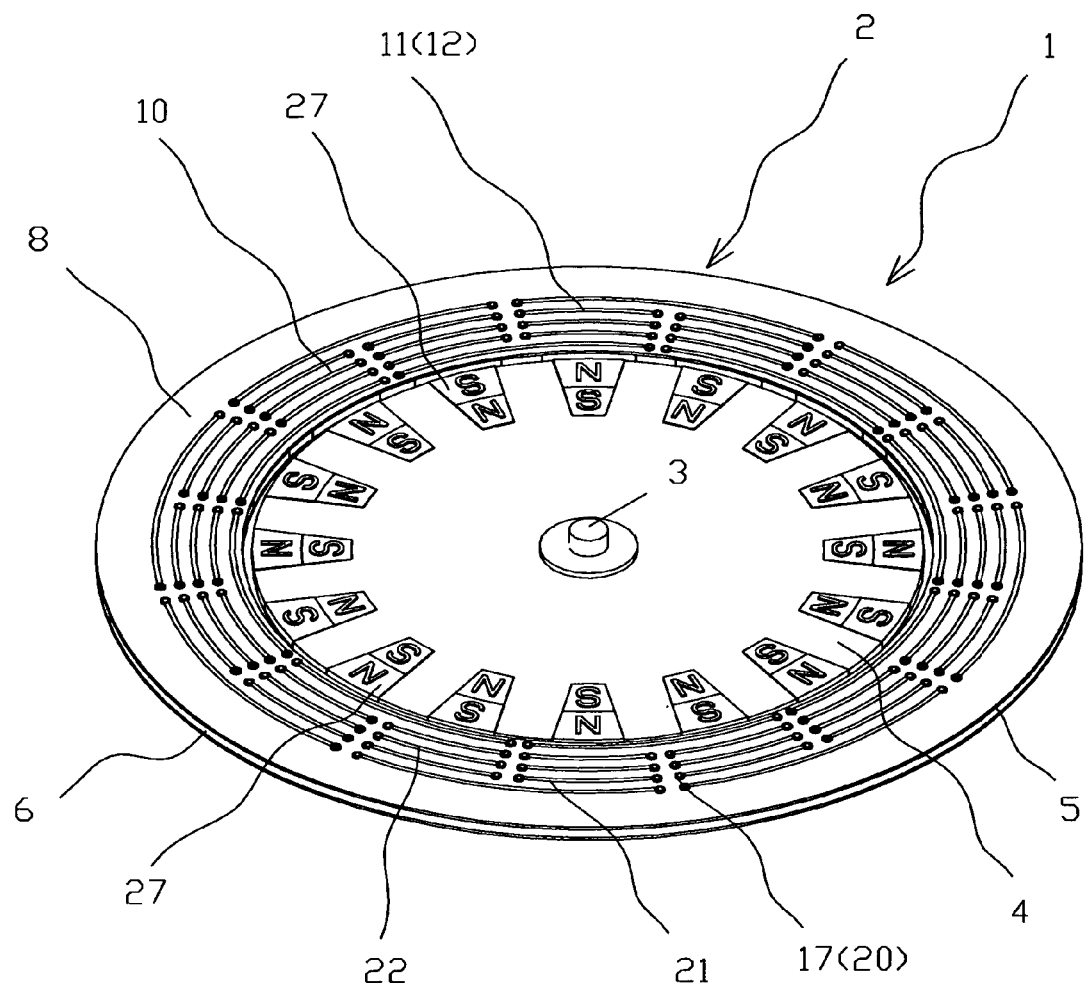
FIG. 3 is a perspective view showing the flat radially interacting electric drive according to the first embodiment.
Figure 4:
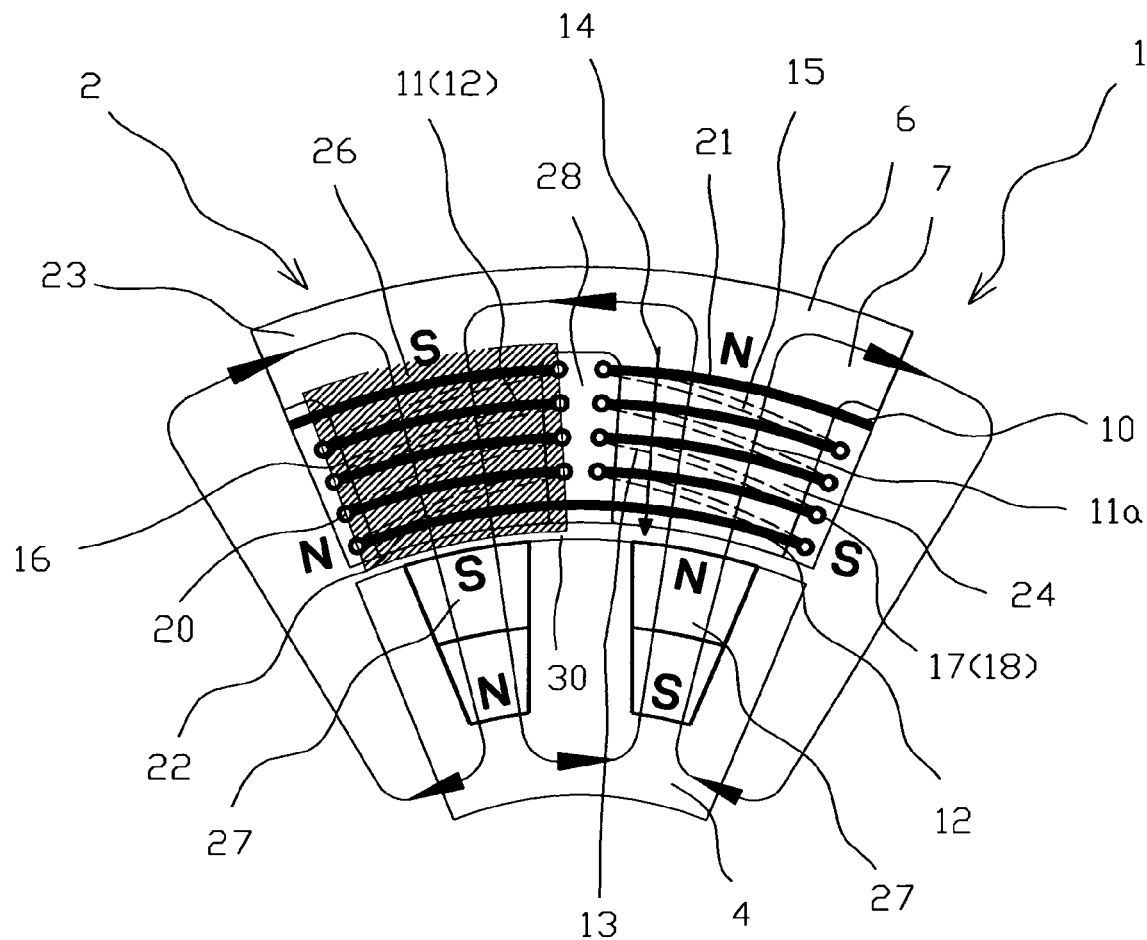
FIG. 4 is a top view showing the segment of the flat radially interacting electric drive according to the first embodiment.
Figure 5:
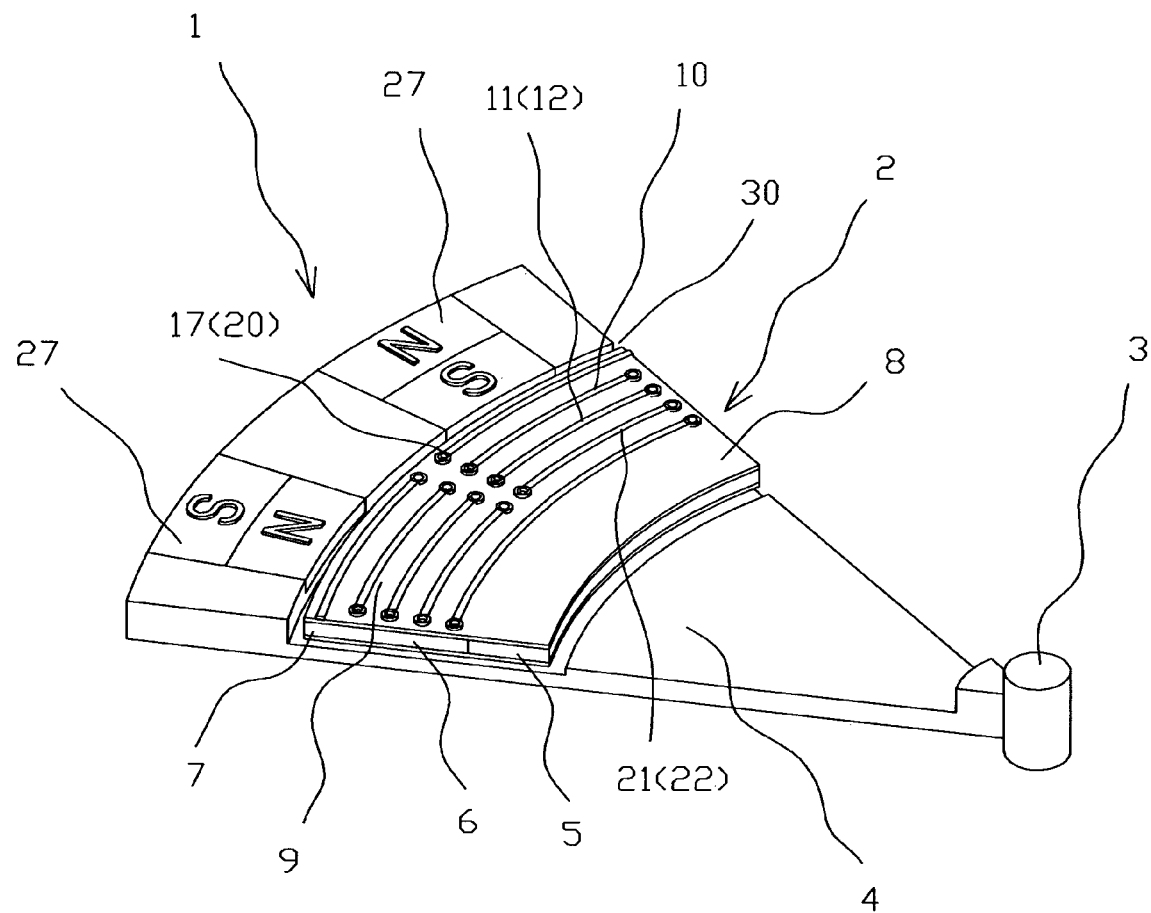
FIG. 5 is a perspective view showing the segment of the flat radially interacting electric drive according to the second embodiment.
Figure 6:
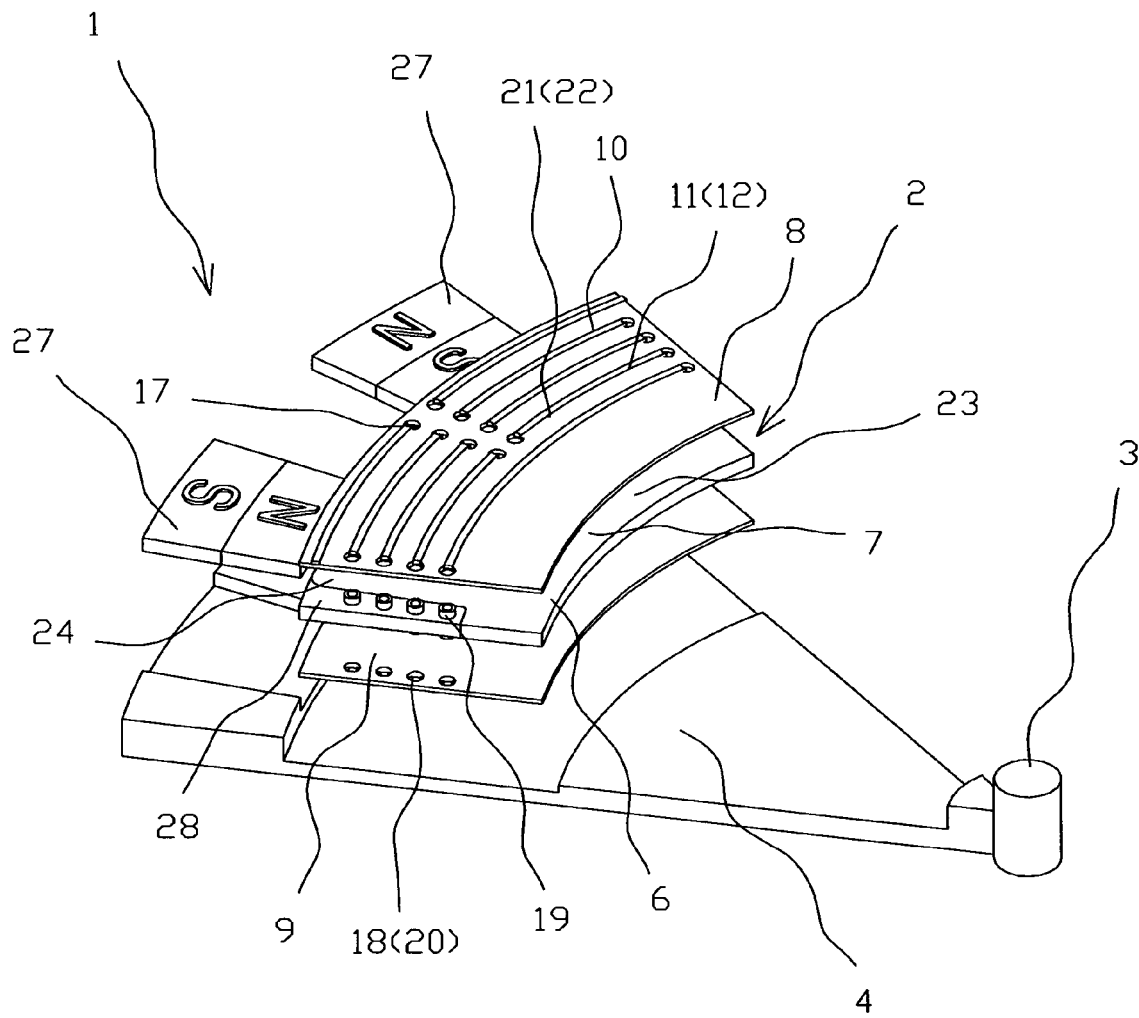
FIG. 6 is a perspective disassembled view showing the segment of the flat radially interacting electric drive according to the second embodiment.
Figure 7:
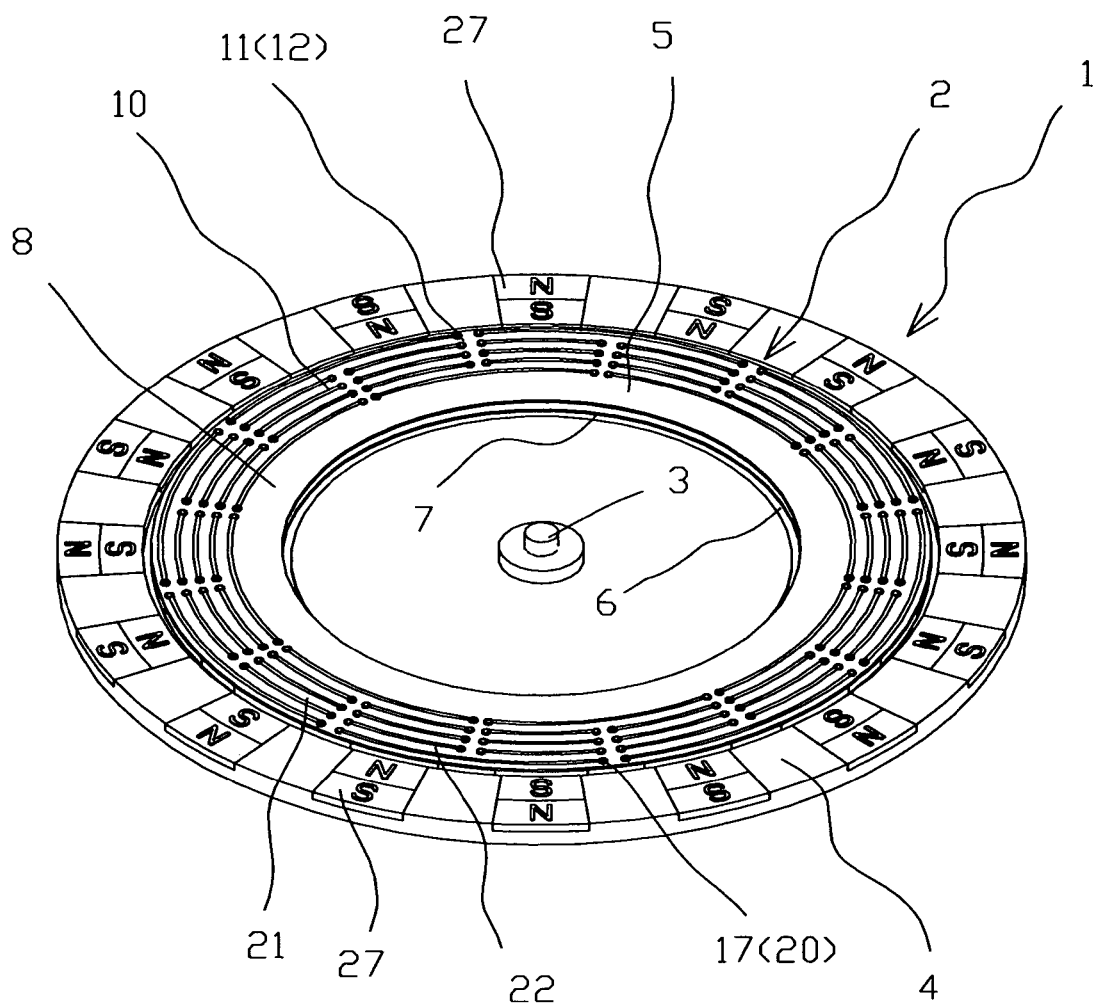
FIG. 7 is a perspective view showing the flat radially interacting electric drive according to the second embodiment.
Figure 8:
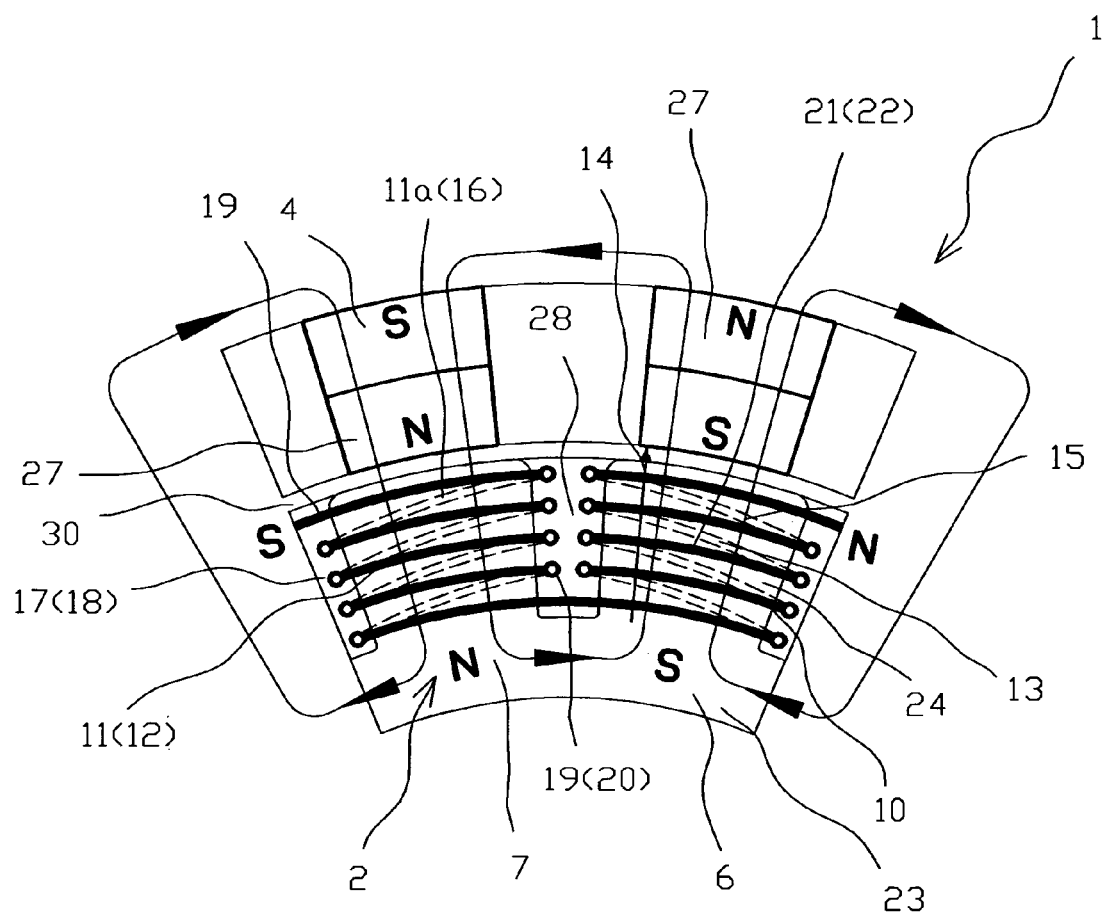
FIG. 8 is a top view showing the segment of the flat radially interacting electric drive according to the second embodiment.
Figure 9:
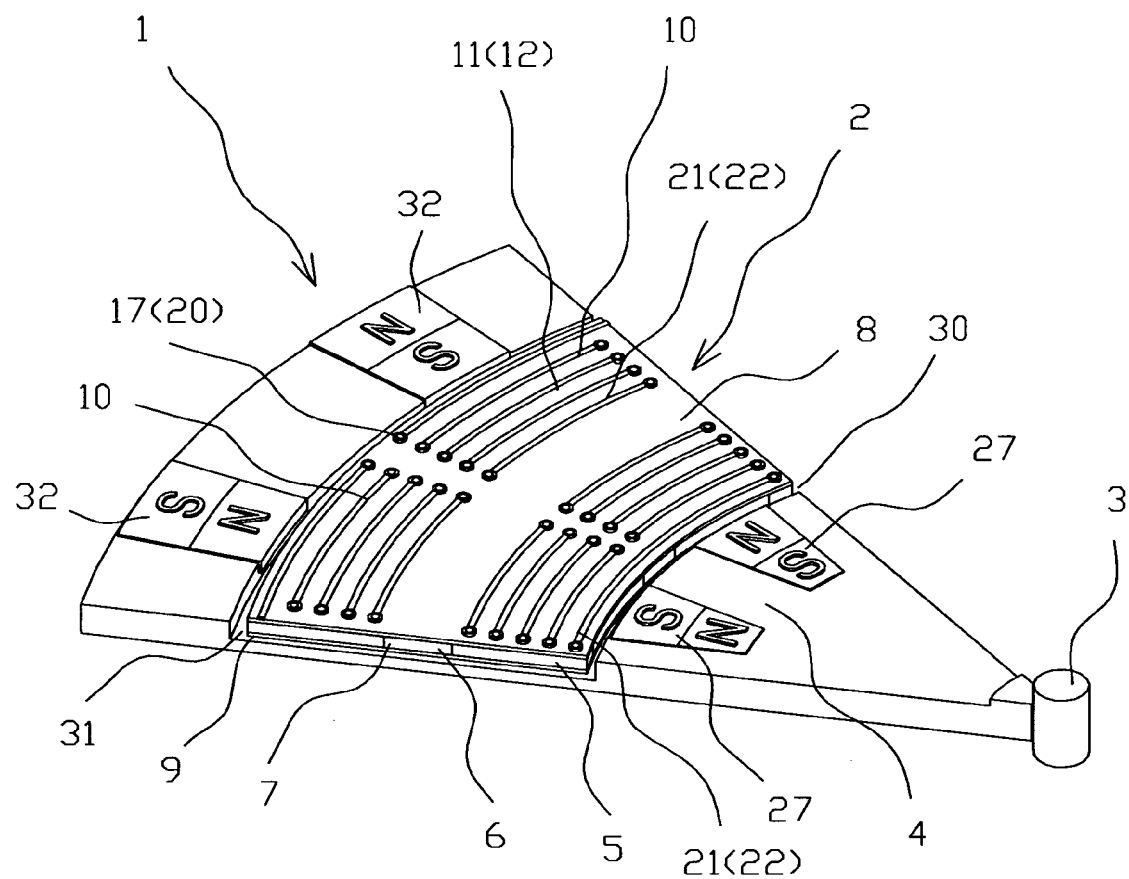
FIG. 9 is a perspective view showing the segment of the flat radially interacting electric drive according to the third embodiment.
Figure 10:
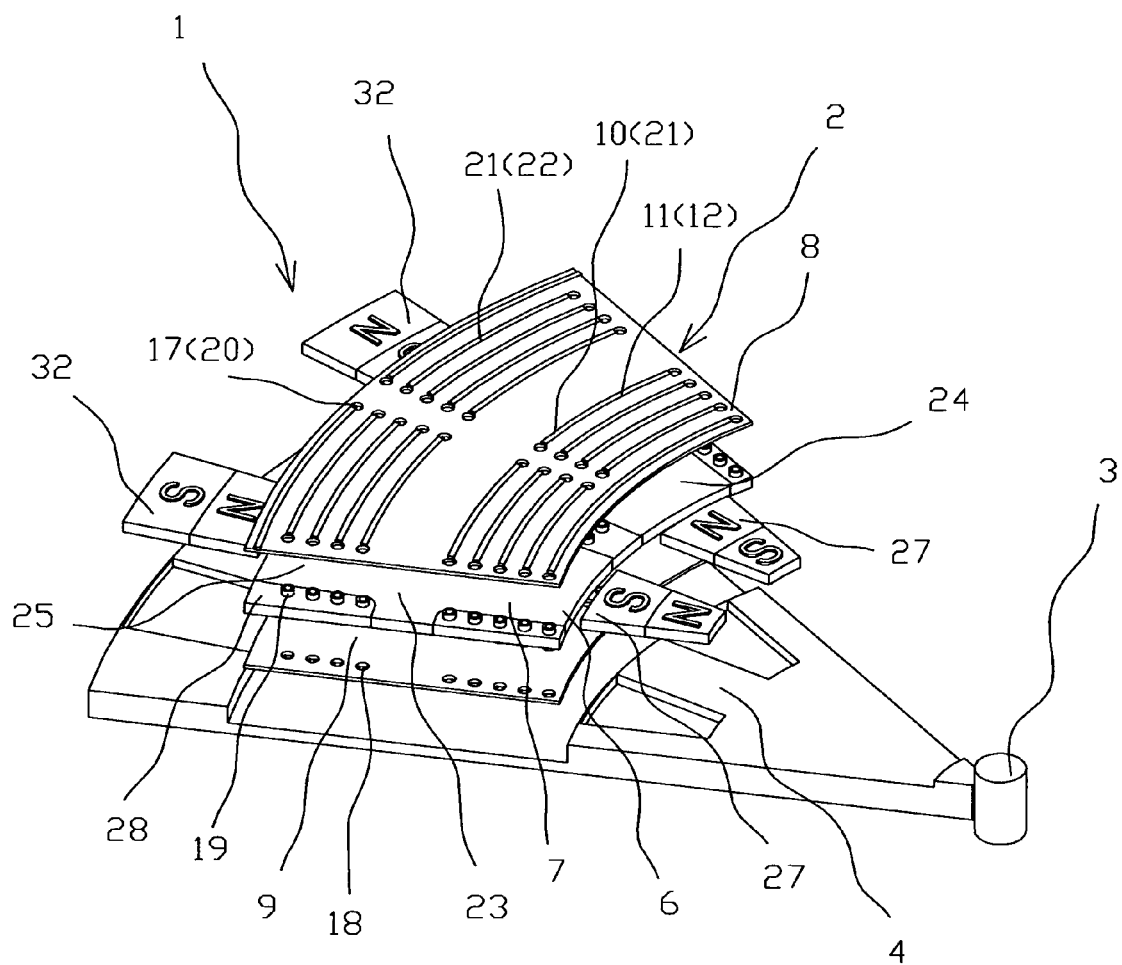
FIG. 10 is a perspective disassembled view showing the segment of the flat radially interacting electric drive according to the third embodiment.
Figure 11:
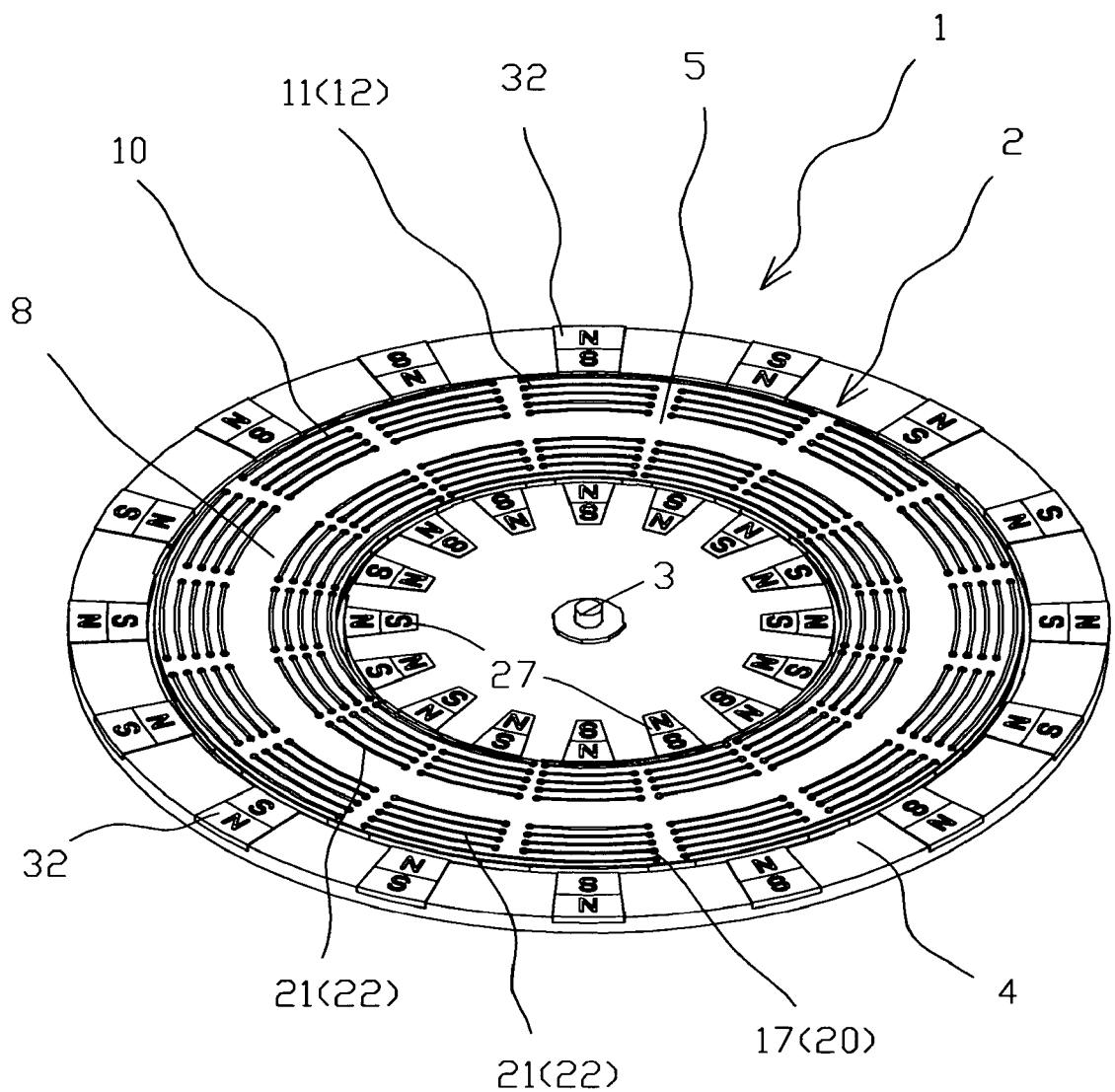
FIG. 11 is a perspective view showing the flat radially interacting electric drive according to the third embodiment.
Figure 12:
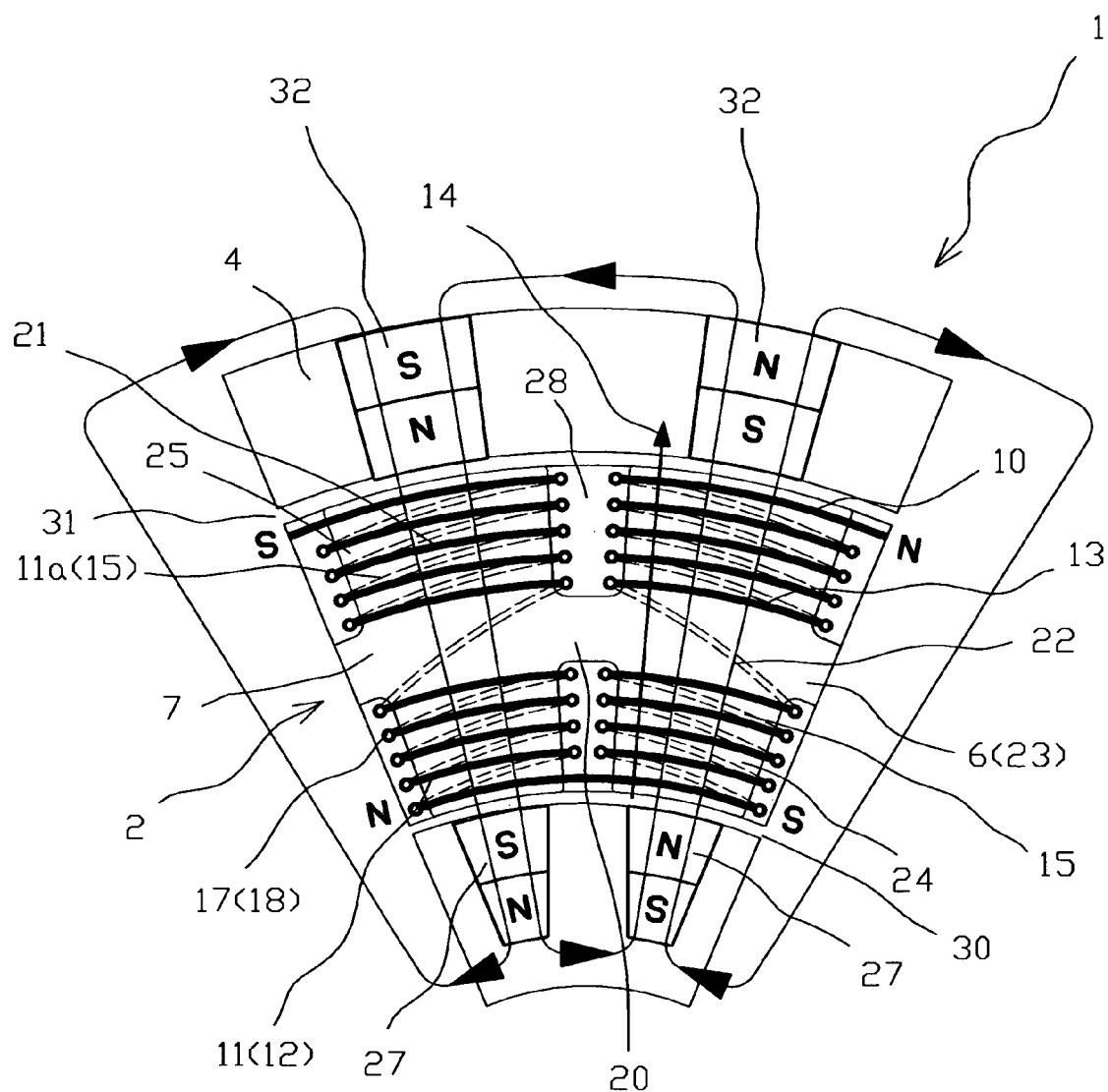
FIG. 12 is a top view showing the segment of the flat radially interacting electric drive according to the third embodiment.
Figure 13:
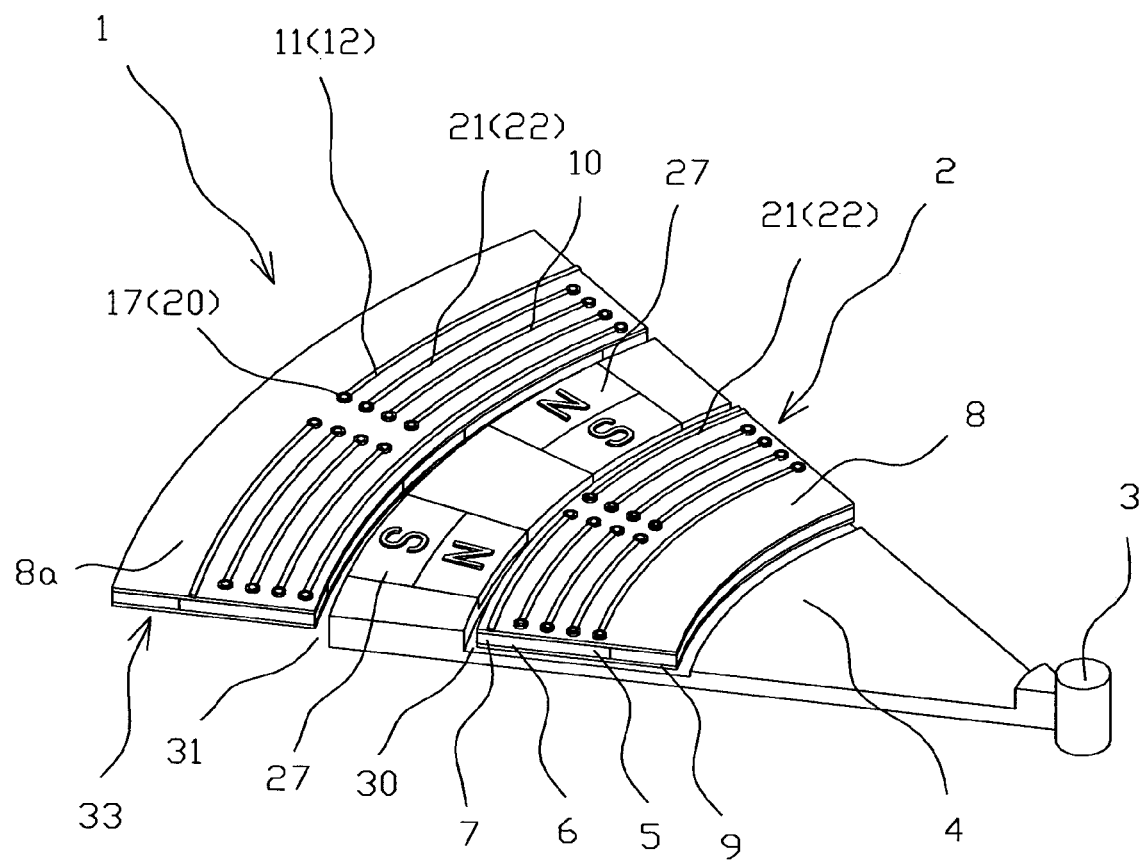
FIG. 13 is a perspective view showing the segment of the flat radially interacting electric drive according to the fourth embodiment.
Figure 14:
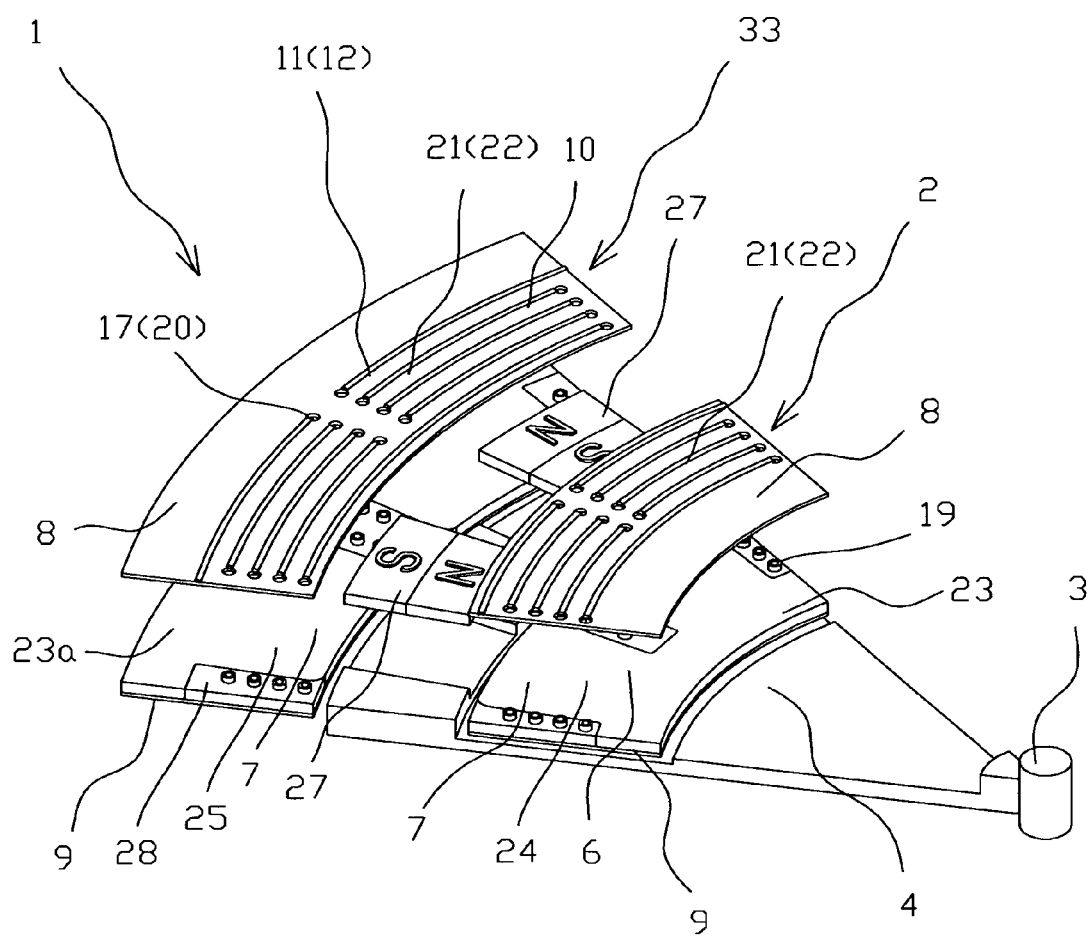
FIG. 14 is a perspective disassembled view showing the segment of the flat radially interacting electric drive according to the fourth embodiment.
Figure 15:
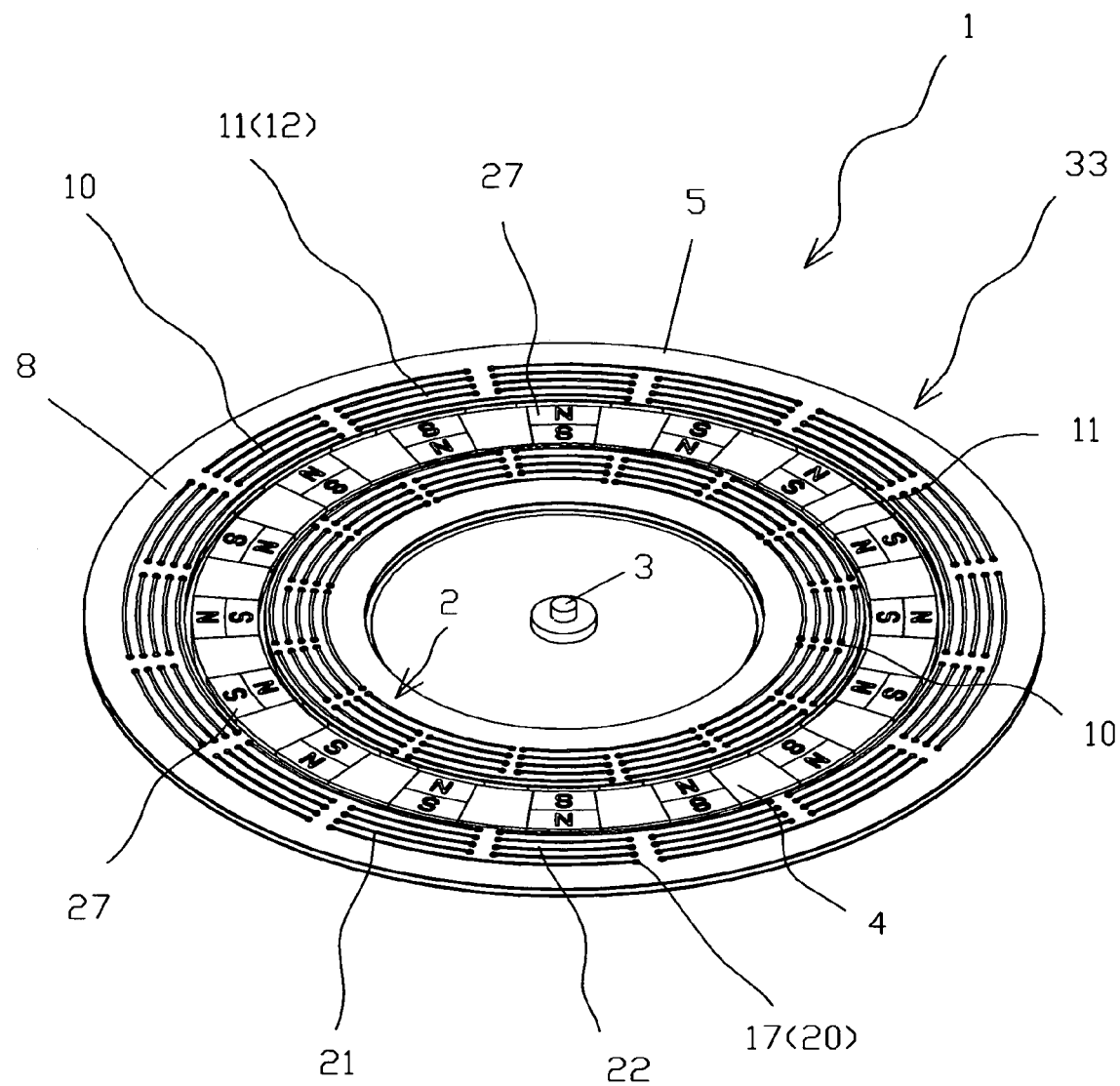
FIG. 15 is a perspective view showing the flat radially interacting electric drive according to the fourth embodiment.
Figure 16:
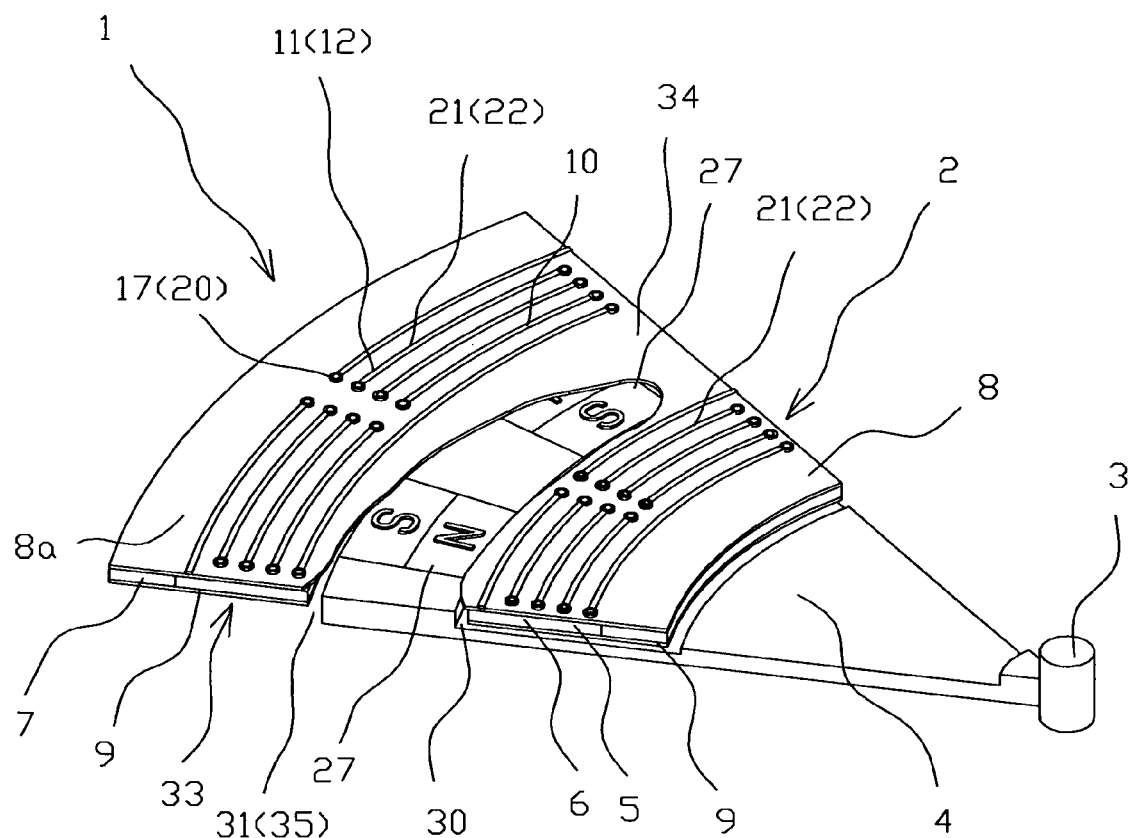
FIG. 16 is a perspective view showing the segment of the flat radially interacting electric drive according to the design option of the fourth embodiment.
Figure 17:
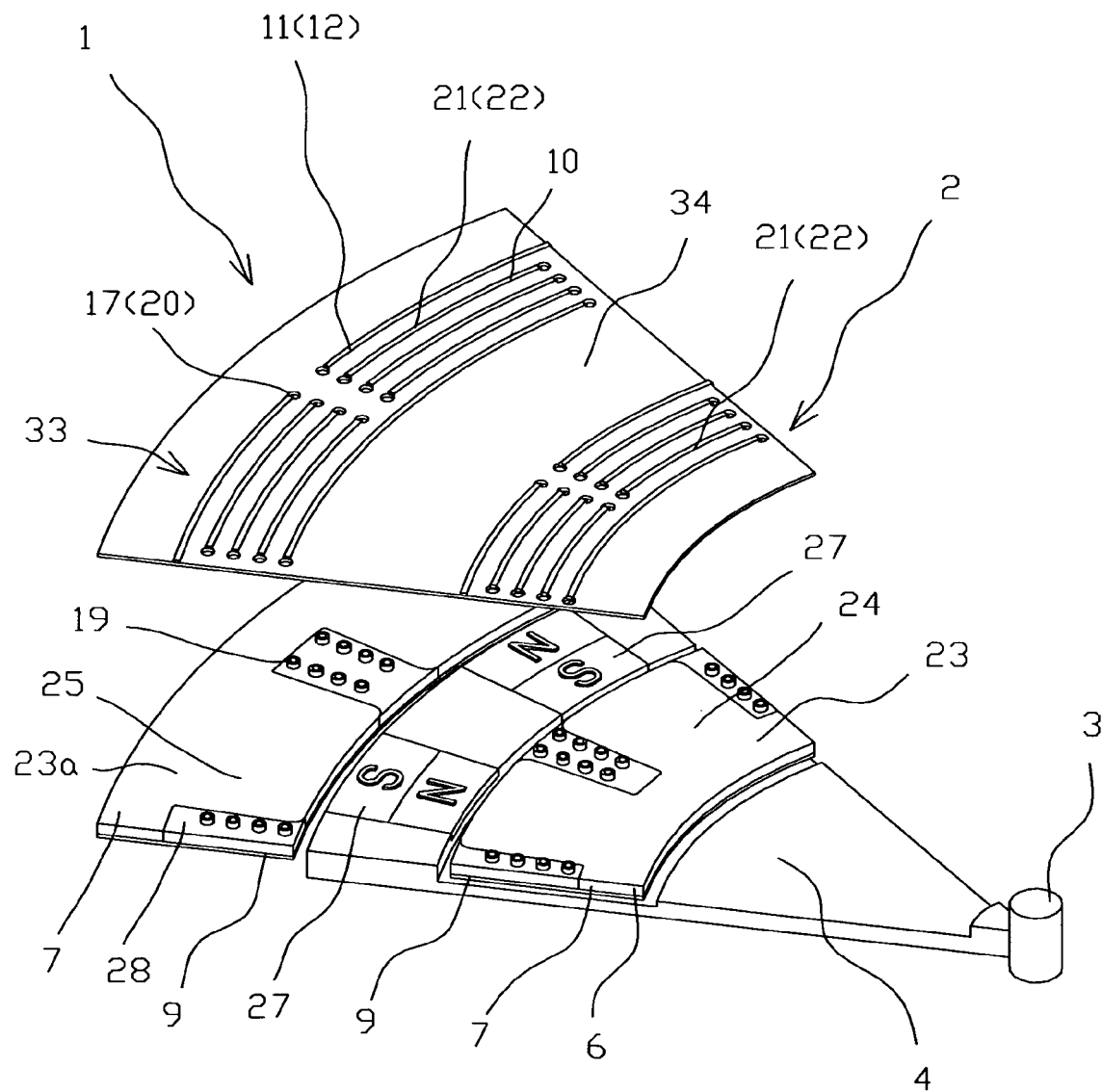
FIG. 17 is a perspective disassembled view showing the segment of the flat radially interacting electric drive according to the design option of the fourth embodiment.
Figure 18:
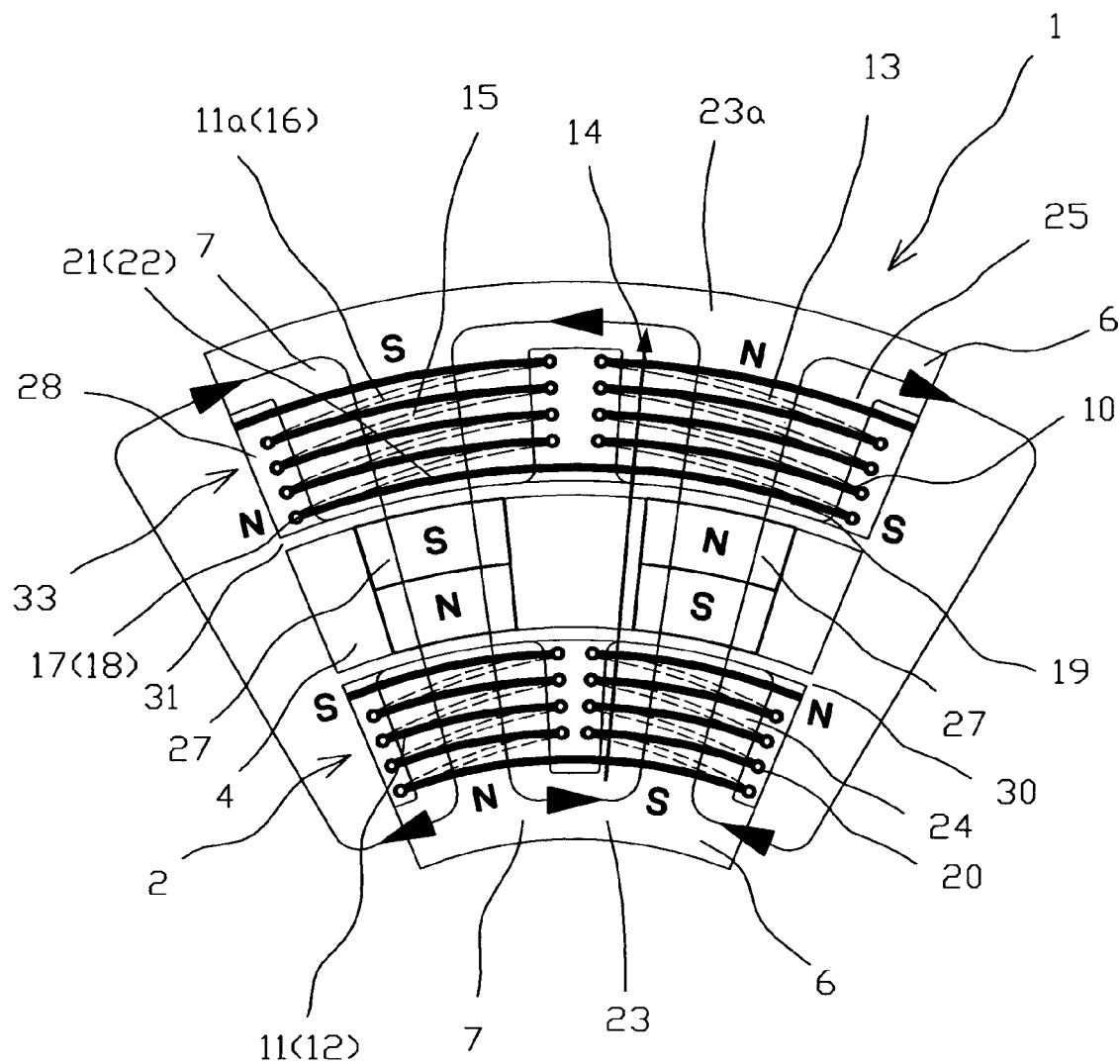
FIG. 18 is a top view showing the segment of the flat radially interacting electric drive according to the fourth embodiment.

FIGS. 1-18 show embodiments of the present invention.

The flat radially interacting electric drive 1 (FIGS. 1-18) comprises a flat stator 2, an axle 3 and a magnetized flat rotor 4. The stator 2 made like a composite structure 5 comprises a layer 6 made of ferromagnetic material serving like a stator core 7 and placed within two layers 8 and 9 of circuit boards. The layer 6 made of ferromagnetic material could be made from silicon steel.

The first 8 of said layers of circuit board comprises circumferentially arrayed groups 10 of traces 11 that are unidirectional segments 12 of zigzag lines 13 with a path 14 directed radially, while the second 9 of said layers of circuit board comprises circumferentially arrayed groups 15 of traces 11a which in transparent view are opposite unidirectional segments 16 of the same zigzag lines 13.

The traces 11 located at the first layer 8 having nodes 17 coincided with corresponding nodes 18 of each of the traces 11a located at the second layer 9 in transparent view.

Each of the traces 11 located at the first layer 8 are electrically connected at the nodes 17 with each corresponding nodes 18 of the traces 11a located at the second layer 9, thus both layers 8 and 9 form circumferentially arrayed spatial continuous zigzag lines 13 serving like coils 21 with magnetic axes directed radially. Such electrical connections could be realized through the holes 19 by vias 20. The coils 21 electrically connected, for example in a series way, thus forming a stator winding with alternated polarity coils. The power leads 29 (FIG. 4) brakes one of the coils 21 for providing of supplied electric power. The magnetic flux lines are shown schematically by arrow lines.

The flat rotor 4 comprises circumferentially arrayed alternatively magnetized flat magnets 27 with radially directed magnetic axes.

The stator core 7 could be made as a flat ring 23 with radial teeth 24 that are located inside of a contour 26 defining by an array of said nodes 17 and 18. A space within two layers 8 and 9 of circuit boards free from the stator core 7 could be filled with electrically nonconductive material 28, for example, epoxy.

There are some embodiments of the present invention. According to the first embodiment (FIGS. 1-4) the magnetized flat rotor 4 placed substantially at the same plane of the flat stator 2 and surrounded by the flat stator 2 through a radial gap 30. A number of the flat magnets 27 is equal a number of the coils 21. The radial teeth 24 located from the inner side of the flat ring 23 and inside of the contour 26 (FIG. 4) defining by the array of the nodes 17 and 18.

There are some design applications of an electric drive when an inner stator placement relatively to a rotor is needed. Such design provided by the second embodiment of the present invention. According to this embodiment (FIGS. 5-8) the flat stator 2 placed substantially at the same plane of the magnetized flat rotor 4 and surrounded by the flat magnets 27 through a radial gap 30. Like at the first embodiment a number of the flat magnets 27 is equal a number of the coils 21, but the stator core 7 has a different design: the radial teeth 24 located from the outer side of the flat ring 23.

There are two options how it possible to increase the torque of the present electric drive 1. The first option is provided by the third embodiment (FIGS. 9-12), when the flat rotor 2 further comprises circumferentially arrayed alternatively magnetized additional flat magnets 32 with radially directed magnetic axes and the flat stator 2 placed substantially at the same plane of the magnetized flat rotor 4 within the flat magnets 27 and the additional flat magnets 32 through radial gaps 30 and 31. Numbers of the flat magnets 27 and the additional flat magnets 32 are equal a number of the coils 21. The radial teeth 24 and 25 are located from the inner and outer sides of the flat ring 23.

The second option of the electric drive power increasing is provided according to the fourth embodiment (FIGS. 13-15 and 18), when the electric drive 1 according to the second embodiment further comprises an additional flat stator 33 similar to the flat stator 2 and placed substantially at the same plane of the magnetized flat rotor 4, thus the magnetized flat rotor 4 surrounded by the additional flat stator 33 through a radial gap 31. A number of the flat magnets 27 is equal a number of the coils 21 and radial teeth 25 of the additional flat stator 33 are located from the inner side of a flat ring 23a of the additional flat stator 33.

There is a design option of the fourth embodiment (FIGS. 16-18), when the first layer 8 of the flat stator 2 and a first layer 8a of the additional flat stator 33 are made like a mutual first layer 34 and the flat rotor 4 is spaced apart from the mutual first layer 34 through an axial gap 35.

According to the present invention a method for manufacturing a flat radially interacting electric drive 1 comprises the following steps of:

(i) providing the first layer 8 of circuit board;

(ii) providing a layer 6 made of ferromagnetic material serving like a stator core 7;

(iii) providing the second layer 9 of circuit board;

(iv) aligning and pressing bond the stator core 7 within the first 8 and second 9 layers of circuit boards;

(v) drilling and copper plating holes 19 with centers located at nodes 17 and 18 of the future traces 11 and 11a;

(vi) etching circumferentially arrayed groups of traces 10 and 15 that are the unidirectional segments 12 and 16 of the zigzag lines 13 on the outer sides of the first 8 and second 9 layers of circuit boards;

(vii) providing a magnetized flat rotor 4 with circumferentially arrayed alternatively magnetized flat magnets 27 with radially directed magnetic axes;

(viii) providing an axle 3;

(ix) assembling the electric drive 1.

The flat radially interacting electric drive 1 gains a rotation torque attributed to an interaction between a magnetic field produced by the magnetized flat rotor 4 and magnetic field produced by exciting coils 21 of the flat stator 2 so to be rotated in one direction. The coils 21 are connected with a controller (not shown on Figs.), for example of type Fairchild NDSSS58H.

Due to the flat rotor 4 placed and magnetized along the plane of the flat stator 2 thus magnetic axes of the coils 21 are located at the same plane; there is no reason for rise of oscillation forces in a direction perpendicular to the plane of the flat stator 2 and the magnetized flat rotor 4. By this reason, there is no vibration of the flat stator 2 and the flat rotor 4. Therefore, the present invention characterized by lower sound level and higher motor efficiency.

Because the magnetized flat rotor 4 made as a whole and magnetized by simple way with single polarity in radial direction, a magnetized flat rotor 4 manufacturing became simple and inexpensive. It is possible to manufacture such magnetized flat rotor 4 much thinner at the same magnetic strength that is very important especially for small size blowers of cooling systems for regulating the temperature of electronic components.

And, the flat radially interacting electric drive 1 according to the present invention provides a design and a method of manufacturing the same, where the flat stator 2 made like a composite structure with the stator core 7 integrated within two layers 8 and 9 of circuit boards, thus overcome in aggregate problems associated with simplicity and cost of the electric drive 1 in general.

What is claimed is:

1. A flat radially interacting electric drive comprising a flat stator, an axle and a magnetized flat rotor, wherein:
   (i) said stator being made of a composite structure comprising a layer made of ferromagnetic material serving as a stator core and placed within two layers of circuit boards;
   (ii) the first of said layers of circuit board comprising circumferentially arrayed groups of traces that are unidirectional segments of zigzag lines with a path directed radially, while the second of said layers of circuit board comprising circumferentially arrayed groups of traces which in transparent view being opposite unidirectional segments of the same zigzag lines;
   (iii) each of said traces located at said first layer having nodes coincided with corresponding nodes of each of said traces located at said second layer in transparent view;
   (iv) each of said traces located at said first layer being electrically connected at said nodes with each said corresponding nodes of said traces located at said second layer, thus both said layers forming circumferentially arrayed spatial continuous zigzag lines serving as coils with magnetic axes being directed radially;
   (v) said coils being electrically connected thus forming a stator winding with alternated polarity coils;
   (vi) said flat rotor comprising circumferentially arrayed flat magnets with radially directed magnetic axes.

2. The electric drive as claimed in claim 1, wherein said stator core being made as a flat ring with radial teeth that being located inside of a contour defining by an array of said nodes.

3. The electric drive as claimed in claim 1, wherein said layer made of ferromagnetic material being made of from silicon steel.

4. The electric drive as claimed in claim 2, wherein a space within said two layers of circuit boards free from said stator core is being filled with electrically nonconductive material.

5. The electric drive as claimed in claim 4, wherein said magnetized flat rotor being placed substantially at the same plane of said flat stator and surrounded by said flat stator through a radial gap.

6. The electric drive as claimed in claim 5, wherein a number of said flat magnets being equal a number of said coils.

7. The electric drive as claimed in claim 5, wherein said radial teeth being located from the inner side of said flat ring.

8. The electric drive as claimed in claim 4, wherein said flat stator being placed substantially at the same plane of said magnetized flat rotor and surrounded by said flat magnets through a radial gap.

9. The electric drive as claimed in claim 8, wherein a number of said flat magnets being equal a number of said coils.

10. The electric drive as claimed in claim 8, wherein said radial teeth being located from the outer side of said flat ring.

11. The electric drive as claimed in claim 4, wherein said flat rotor further comprising circumferentially arrayed alternatively magnetized additional flat magnets with radially directed magnetic axes and said flat stator being placed substantially at the same plane of said magnetized flat rotor within said flat magnets and said additional flat magnets through radial gaps.

12. The electric drive as claimed in claim 11, wherein numbers of said flat magnets and said additional flat magnets being equal a number of said coils.

13. The electric drive as claimed in claim 11, wherein said radial teeth being located from the inner and outer sides of said flat ring.

14. The electric drive as claimed in claim 10, further comprising an additional flat stator similar to said flat stator and placed substantially at the same plane of said magnetized flat rotor, thus said magnetized flat rotor being surrounded by said additional flat stator through a radial gap.

15. The electric drive as claimed in claim 14, wherein a number of said flat magnets being equal a number of said coils.

16. The electric drive as claimed in claim 14, wherein radial teeth of said additional flat stator being located from the inner side of a flat ring of said additional flat stator.

17. The electric drive as claimed in claim 14, wherein said first layer of said flat stator and a first layer of said additional flat stator being made like a mutual first layer and said flat rotor being spaced apart from said mutual first layer through an axial gap.

* * * * *